United States Patent
Bosen (10) Patent No.: US 9,969,307 B1
(45) Date of Patent: May 15, 2018

(54) PIVOT ARM MOUNTED ENERGY ATTENUATING SEAT

(71) Applicant: Armorworks Holdings, Inc., Chandler, AZ (US)

(72) Inventor: David A. Bosen, Tempe, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 24 days.

(21) Appl. No.: 15/276,413

(22) Filed: Sep. 26, 2016

(51) Int. Cl.
*B60N 2/427* (2006.01)
*B60N 2/42* (2006.01)
*B64D 11/06* (2006.01)
*B63B 29/04* (2006.01)

(52) U.S. Cl.
CPC ....... *B60N 2/42709* (2013.01); *B60N 2/4242* (2013.01); *B60N 2/4249* (2013.01); *B63B 29/04* (2013.01); *B64D 11/0619* (2014.12); *B63B 2029/043* (2013.01)

(58) Field of Classification Search
CPC .............. B60N 2/42709; B60N 2/4242; B60N 2/4249; B64D 11/0619; B63B 29/04; B63B 2029/043
See application file for complete search history.

(56) References Cited

U.S. PATENT DOCUMENTS

| | | | |
|---|---|---|---|
| 3,268,200 A * | 8/1966 | Eicher ................... | B60N 2/045 248/543 |
| 3,572,828 A * | 3/1971 | Lehner ................... | A47C 31/00 248/567 |
| 4,047,759 A * | 9/1977 | Koscinski ............. | B60N 2/502 248/567 |
| 5,558,301 A | 9/1996 | Kerdoncuff et al. | |
| 7,938,485 B1 | 5/2011 | Perciballi et al. | |
| 8,087,723 B2 * | 1/2012 | Honnorat ............. | B60N 2/4242 244/122 R |
| 8,342,300 B2 | 1/2013 | Guillon | |
| 8,403,410 B1 | 3/2013 | Pinger et al. | |
| 8,550,553 B1 * | 10/2013 | Clark ................... | B60N 2/4242 297/216.16 |
| 8,561,748 B1 | 10/2013 | Hahn et al. | |
| 8,678,465 B1 | 3/2014 | Aragon et al. | |
| 8,840,163 B1 * | 9/2014 | Wilhelm ............... | A61G 3/085 296/19 |
| 8,939,502 B2 | 1/2015 | Grant et al. | |
| 9,132,753 B1 | 9/2015 | Campbell | |

(Continued)

*Primary Examiner* — Philip F Gabler
(74) *Attorney, Agent, or Firm* — James L Farmer (57) ABSTRACT

Methods and apparatus are provided for a pivot arm mounted energy attenuating vehicle seating system. In one exemplary embodiment the vehicle seating system includes a seat with a pair of left upper and lower seat pivots, and a pair of right upper and lower seat pivots; and apart from the seat a pair of left upper and lower stationary pivots, and a pair of right upper and lower stationary pivots. A pair of left and right upper pivot arms are connected at one end to a respective upper seat pivot, and at the other end to a respective upper stationary pivot; and a pair of left and right lower pivot arms are similarly connected at one end to a respective lower seat pivot, and at the other end to a respective lower stationary pivot. The seating system may further include an energy attenuating member with a first end attached to the seat and a second end configured for attachment to a vehicle compartment.

20 Claims, 6 Drawing Sheets

(56) References Cited

U.S. PATENT DOCUMENTS 9,221,361 B1 12/2015 Platt et al.
2016/0068085 A1* 3/2016 Mindel ................. B60N 2/427
297/216.16

* cited by examiner

PIVOT ARM MOUNTED ENERGY ATTENUATING SEAT

TECHNICAL FIELD AND BACKGROUND

The technical field of the present invention relates to energy attenuation technology for reducing the severity of shock loads experienced by vehicle occupants during high energy impact events, and to the incorporation of such technology in land vehicle, watercraft, and aircraft seating systems.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

An exemplary energy attenuating seat mounting system in accordance with the present disclosure is indicated generally at reference numeral 1 in the drawing Figures. Referring initially to FIGS. 1 through 5, the seat mounting system comprises matching, or mirrored left and right linkages 3, and associated left and right energy attenuating devices or members 4, all disposed between a seat 5 and a structural portion of the vehicle compartment (not shown). Each linkage 3 comprises upper and lower, generally horizontally extending pivot arms 9 and 11 that are pivotally connected at one end to seat 5 through seat pivots 12, and at the other end to the vehicle compartment through stationary pivots 13.

In the depicted embodiment the seat pivots 12 are built into left and right sides of the seat frame 14, and the stationary pivots 13 are part of a stationary bracket 16. Alternatively, the left and right seat pivots may be part of a separate seat mounting bracket 27 (see e.g. FIG. 8) configured for attachment to the seat, and bracket 16 may instead comprise a pair of stationary brackets with one dedicated bracket for each linkage 3. Similarly, a separate seat mounting bracket 27 may be configured as a pair of separate left and right brackets, or as one wide bracket like the depicted stationary bracket 16. Stationary bracket 16 is configured to be attached to or integrated with the vehicle compartment structure. As discussed further below, the attachment to the vehicle may be direct, such as by bolting the flange to an interior wall, or indirect such as through the exemplary seat height adjustment mechanism 19 shown in FIG. 1.

The pivot arms, seat pivots, and stationary pivots are configured and arranged to provide certain symmetries. For example, the left pair of pivot arms may be an identical mirrored version of the right pair of pivot arms. Further, in one embodiment the four left pivots and the four right pivots each define identical parallelograms, wherein the distances between the seat pivots and between the stationary pivots are identical, and the pivot-to-pivot lengths of the upper and lower pivot arms 9 and 11 are also identical. The two parallelograms may also be aligned, wherein the four seat pivots all lie in a first plane, and the four stationary pivots all lie in a second plane parallel to the first plane.

In such a symmetrical configuration, the seat 5 and stationary bracket 16 stay parallel to one another, as do the pivot arms, no matter the angle between the pivot arms and the seat. Thus the seat will stay parallel to the stationary bracket 16 when caused to move in an up or down direction, while at the same time translating (without rotating) along an arcuate path defined by a corresponding rotational motion of the pivot arms 9, 11. The path followed by the seat at the upper seat pivot 12 for example is indicated by dashed line 17 in FIG. 3. Moreover, because there is no rotation, every point on the seat traces identical arcuate paths that are exactly parallel to line 17 and to each other.

Figure 1:
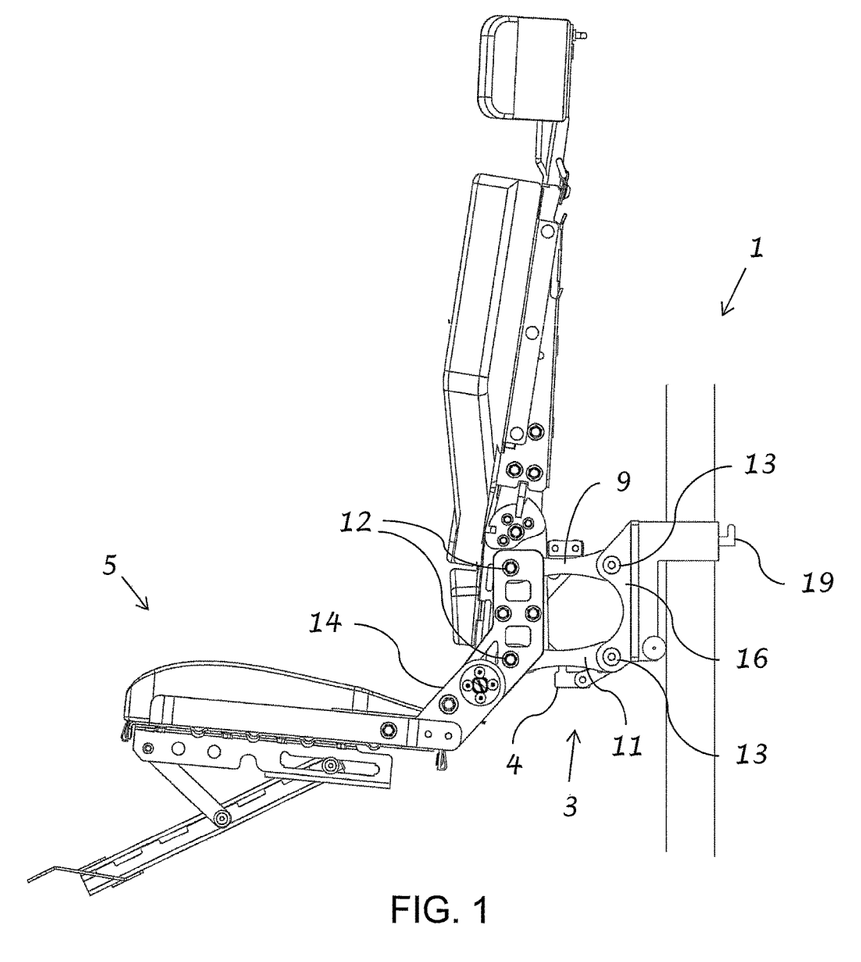
FIG. 1 is a side view of an exemplary pivot arm mounted energy attenuating seating system in accordance with the present disclosure.
Figure 2:
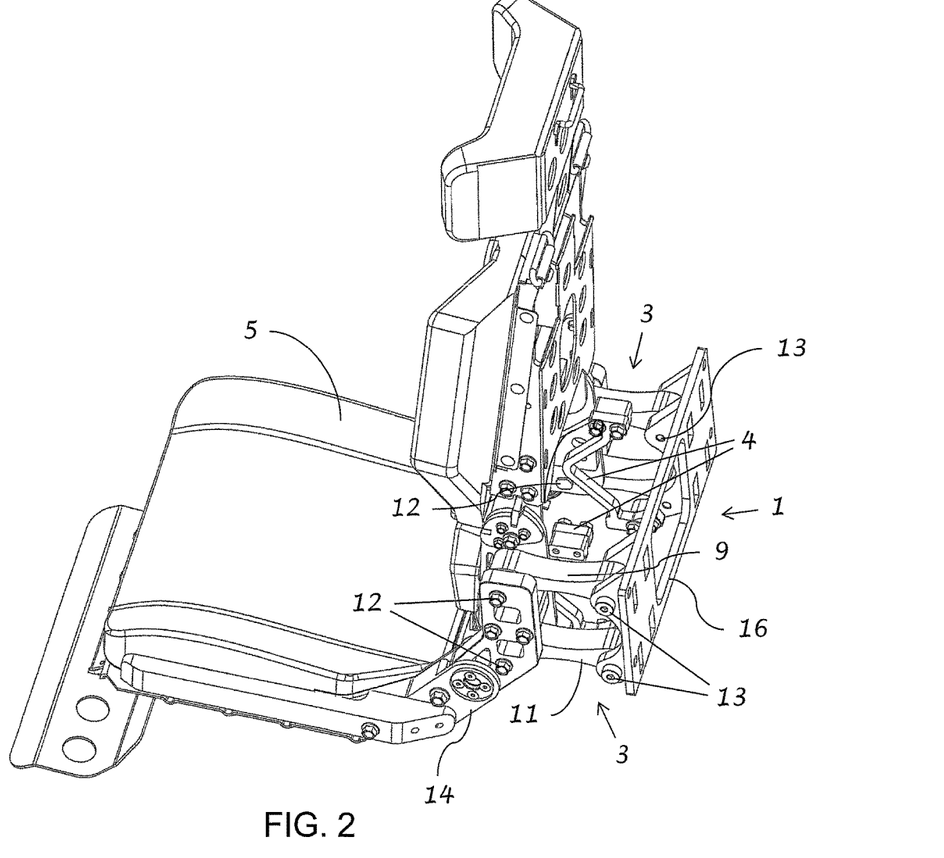
FIG. 2 is a rear perspective view of the seating system of FIG. 1.
Figure 3:
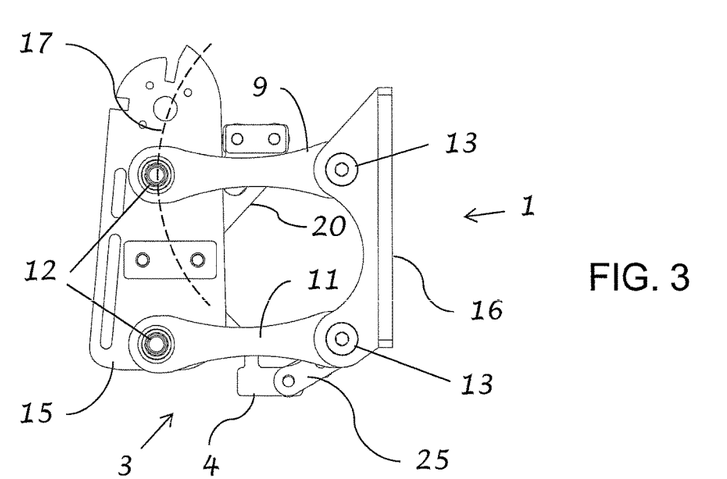
FIG. 3 is a partial cut-away side view of the seat mounting elements of the seating system of FIG. 1.

Under normal conditions, or in other words in the absence of the type of catastrophic vertical acceleration associated with an under-vehicle explosion or an aircraft slam down (generally "impact event"), the seat is held in place and prevented from simply swinging downward by rigid energy attenuating ("EA") members 4. The EA members 4 extend from the seat 5 (or seat frame elements 15) to the fixed vehicle structure directly or indirectly through a bracket such as stationary brackets 16 as shown. In the embodiment shown there are two identical EA members, one associated with each linkage 3, although there could be more than or less than the two depicted EA members. For example, there could be one centrally located EA member, or two on each side for a total of four. As can be seen in FIG. 2, the two depicted EA members are positioned to the insides of seat frame elements 15, and are thus also visible in FIG. 5, while the pivot arms 9, 11 are on the opposite, or outward sides of frame elements 15, and thus visible instead in FIG. 3.

The EA members 4 may comprise crushable or extensible metal constructions that are rigid and strong enough to support the weight and G-loads of an occupied seat while the load is below a predetermined threshold value, yet capable of deforming in a controlled manner and absorbing the energy of an impact event that produces shock loads above the threshold value. The EA members 4 absorb energy through plastic (or permanent) deformation of the metal, and may comprise any generally rigid, non-brittle metal, such as brass, aluminum, steel, or alloys thereof. For example in one particular embodiment the EA members are made of a high strength aluminum alloy such as 6061-T6.

Figure 4:
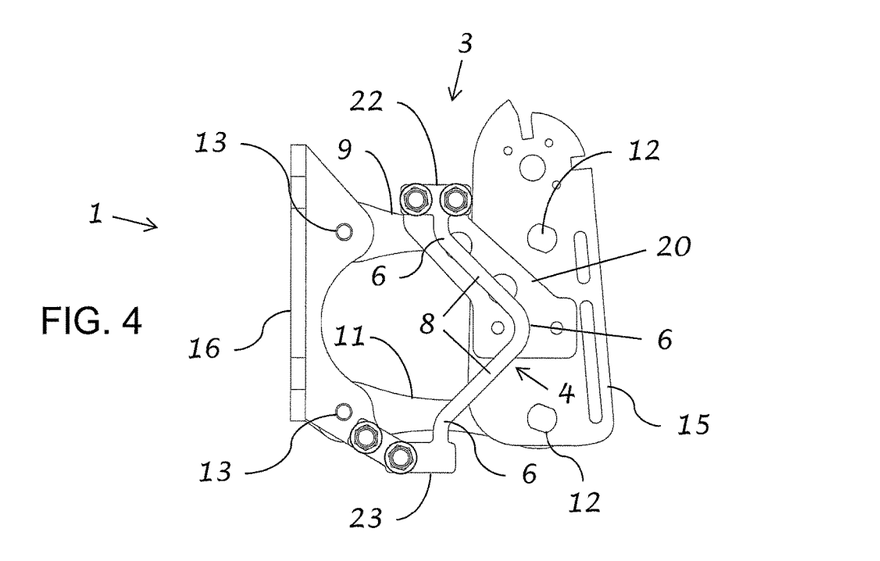
FIG. 4 shows the seat mounting elements of FIG. 3 viewed from the opposite side.
Figure 5:
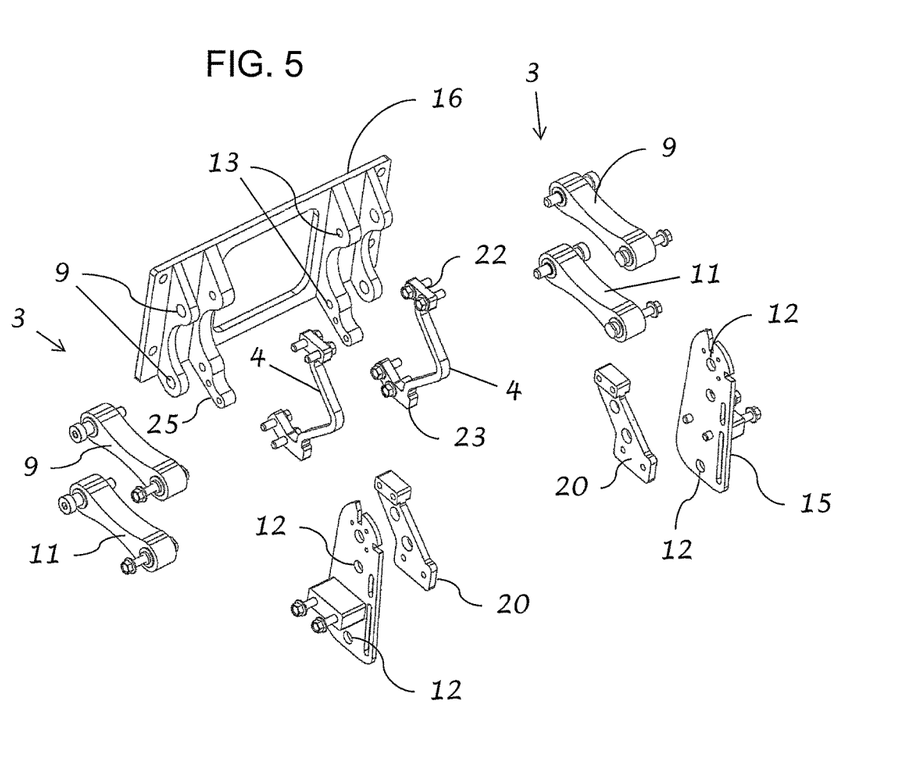
FIG. 5 is an exploded view of the seat mounting elements of FIG. 3.

In the depicted embodiment, each EA member 4 comprises an elongated bar formed in a sideways letter "V" shape, with bends, or angles 6 at each end and in the middle, separated by straight sections 8 (see FIG. 4). An upper end 22 of each EA member 4 is rigidly attached to seat frame 14, and a lower end 23 is rigidly attached to the stationary bracket 16. The upper and lower ends 22, 23 may comprise wide bolted flanges as shown. As can be seen referring momentarily to FIGS. 8 through 10, the bolted flange attachments prevent the ends of the EA members from rotating during an impact event as the EA member is crushed, forcing substantially all of the deformation to occur between the ends in the bar portion of the EA members.

The EA members 4 may be custom tailored to any particular application by modifying material properties, thicknesses, and/or shapes. In one exemplary implementation the EA members are configured to effectively attenuate a vertical impact of a 6.5 meters-per-second impulse due to mine blast or improvised explosive device (IED), and fully attenuate road shock loads transmitted through a vehicle chassis structure of at least 10 G's vertical, while supporting a $95^{th}$ weight percentile seat occupant.

Additional suitable EA member and "EA link" embodiments are disclosed for example in U.S. Pat. Nos. 7,938,485, 8,403,410, 8,678,465, and D657,312, all of which are assigned to the assignee of the instant invention, and hereby incorporated by reference. Alternatively, the EA members may comprise any other crushable or extensible EA structure known in the art, such as crush tubes, inversion tubes, metal shearing or tearing devices, and the like. Although deformable EA devices such as EA members 4 may be configured to protect a seated occupant for multiple impact events, they are generally considered disposable and easily replaced to restore a maximum level of protection to the EA seat.

The particular position, orientation, and attachment configuration of EA member 4 may vary substantially without departing from the fundamental scope of the invention. For example, in the embodiment of FIGS. 1 through 5, the upper end 22 of EA member 4 is attached to the seat frame element 15 indirectly through an offset flange 20 that extends rearward from the seat toward stationary bracket 16. The lower end 23 of EA member 4 is attached to a forward extension 25 of stationary bracket 16. As a result, EA member 4 is located at a position substantially in between the seat and bracket 16. In the depicted embodiment the flange 20 is a separate bolted-on part, and extension 25 is an integral portion of bracket 16, although both elements 20 and 25 could be configured as either separate or integral parts. Of course other EA device attachment schemes and locations are possible and may be preferable depending on the constraints of a particular installation of the seating system.

Figure 6:
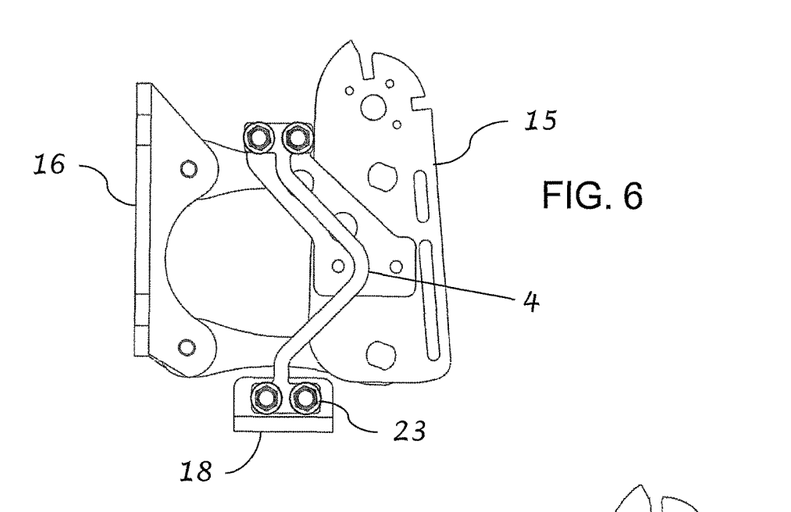
FIG. 6 is a side view of another exemplary embodiment of the seat mounting elements wherein a lower end of the energy attenuating member is attached to a separate dedicated bracket.
Figure 7:
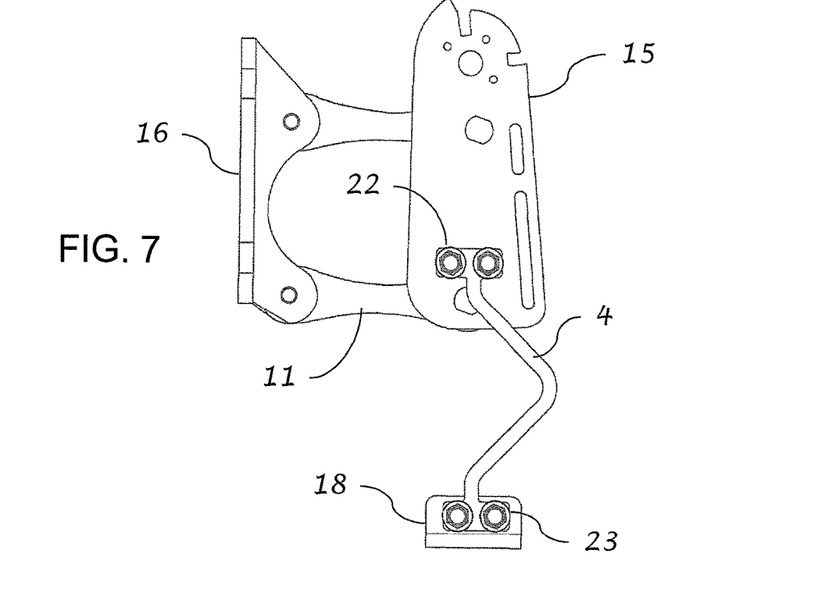
FIG. 7 is a side view of the the seat mounting elements of FIG. 6, with the energy attenuating member shifted downward relative to the other elements.

FIGS. 6 and 7 illustrate two examples of such equivalent, alternative positioning and attachment configurations for EA member 4. Referring first to FIG. 6, the upper end 22 of EA member 4 is again attached to seat frame element 15 indirectly through offset flange 20. However the lower end 23 of EA member 4 is attached to a separate stationary EA bracket 18 instead of to stationary bracket 16. Like bracket 16, stationary bracket 18 is also configured for attachment to the vehicle compartment.

In the embodiment of FIG. 7, EA member 4 has been shifted downward relative to the rest of the linkage, with the upper end 22 connected directly to a lower portion of seat frame element 15, and the lower end 23 connected to a stationary bracket 18 also shifted downward. In both alternative embodiments, as in the embodiment of FIGS. 1 through 5, the EA members still effectively connect to the seat (through e.g. frame element 15, flange 20, or a separate bracket 27) at one end, and to the vehicle compartment (via stationary flanges 16 or 18) at the other end. Thus all three embodiments effectively define the same mechanism, namely an EA member with an upper end constrained to move with the seat, and a lower end grounded to the vehicle compartment.

In addition, the stationary flange or flanges may themselves be indirectly attached to the vehicle compartment. For example, as mentioned above stationary flange 16 may be attached to an optional seat height adjustment mechanism 19 (see FIG. 1) that allows the seat 5 and seat mounting system 1 to be vertically adjusted as a unit, and locked in place at a desired height. In such a system, once the seat height adjustment mechanism is locked, the stationary flanges 16 and 18 become effectively fixed to the vehicle compartment structure as in the above described embodiments.

Figure 8:
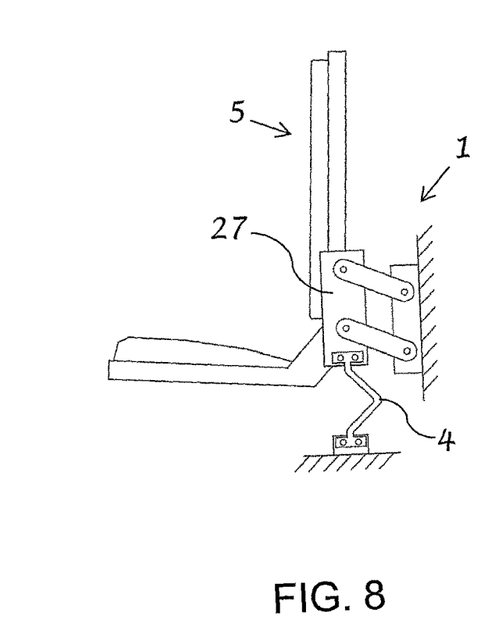
FIGS. 8 through 10 schematically illustrate the sequential displacement of the seating system and deformation of the energy attenuating member during a high energy impact event.
Figure 9:
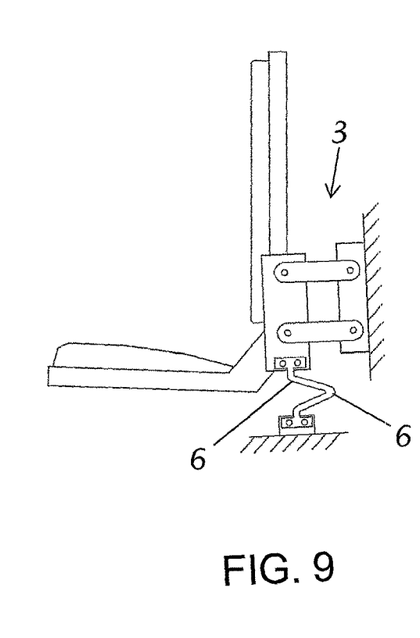
Figure 10:
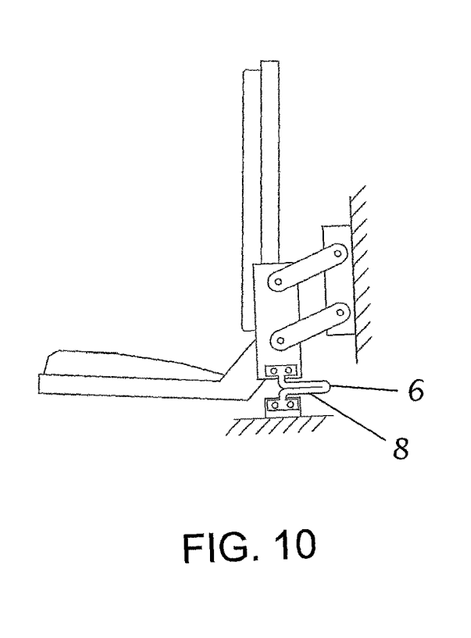

The operation of the seating system during an impact event is schematically illustrated in the sequence of FIGS. 8 through 10. It should be noted that the seat mounting system shown is again equivalent to the previously described embodiments. In particular, the upper end of the EA member is depicted as connecting to the seat, with the lower end connecting to a stationary bracket 18, essentially equivalent to the above described embodiment of FIG. 7. It should be further appreciated that other configurations could have been chosen as well without affecting the substance of the invention, such as for example a configuration with flange 18 integrated with flange 16 instead of separately connected to the vehicle compartment.

The impact event sequence begins at FIG. 8 in which the seat and mounting system are depicted under normal, or pre-impact operating conditions, with the seat in an upward most position supported by rigid and un-deformed EA members 4. In this pre-impact condition the exact rotational orientation of the pivot arms 9, 11 is not critical, and can vary substantially as may be dictated by the design or performance requirements of a particular installation. For example, the pivot arms may be angled in an upward direction as shown to elevate the seat pivots 12 above the stationary pivots 13, or substantially horizontal as in the previously depicted embodiments.

The sequence continues at FIG. 9, depicting the seating system after the onset of a catastrophic impact event in which the threshold load has been exceeded. At this stage the seat has begun to stroke downward toward the floor of the vehicle as the pivot arms 9 and 11 rotate downward (or counterclockwise in the view of FIG. 9) about the stationary pivots 13. The EA members 4 are partially crushed or collapsed by permanent bending of the metal, primarily occurring in the bends 6 at the middle and ends rather than straight sections 8.

In FIG. 10, the seat has completed the stroke toward the floor and bottomed out, as characterized by the EA members having been completely and permanently collapsed. For the type of crushable EA member shown, this occurs when the straight sections 8 are essentially folded one on top of the other as shown. Throughout the process of the seat and mounting system transitioning from pre-impact condition of FIG. 8 to fully stroked condition of FIG. 10, the EA members are attenuating, or absorbing the energy of the event through plastic deformation of the metal. The seat mounting system is preferably configured such that substantially all of the energy associated with the impact event is fully attenuated at the moment that the seat and EA members completely bottom out.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. For example, instead of being positioned behind and extending away from the back of the seat, the mounting system 1 could instead extend from a side of the seat to an adjacent vehicle compartment side wall or column. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating vehicle seating system configured to attenuate shock loads imparted through a vehicle compartment to a seat occupant during a high energy impact event, the seating system comprising:
    left and right mirrored pairs of generally horizontally extending pivot arms, each pair of pivot arms comprising an upper pivot arm and a lower pivot arm, with the lower pivot arm disposed below and parallel to the upper pivot arm, wherein the left and right pairs of pivot arms are each pivotally connected at first ends thereof to a seat by left and right pairs of upper and lower seat pivots respectively, and at second ends thereof to left and right pairs of upper and lower stationary pivots respectively, and wherein a spacing between upper and lower seat pivots and upper and lower stationary pivots are the same, and a pivot-to-pivot length of each pivot arm is the same, the pivot arms thereby constraining the seat to translate without rotation along an arcuate path in a substantially vertical direction from a beginning position to an ending position; and
    an energy attenuating member disposed between the seat and vehicle compartment, comprising an elongated metal bar between an upper flange and a lower flange, the upper flange rigidly connected to the seat, and the lower flange configured for rigid attachment to the vehicle compartment, wherein the energy attenuating member is configured to remain rigid while shock loads imparted to the seat through the energy attenuating member are less than a predetermined threshold value, and to deform in a predictable manner in response to a shock load exceeding the threshold value, allowing the pivot arms to rotate about the stationary pivots, and the seat along with the upper flange of the energy attenuating member to translate without rotation along the arcuate path between the beginning and ending positions.

2. The vehicle seating system of claim 1, wherein the energy attenuating member comprises identical left and right energy attenuating members, and wherein the upper and lower flanges of the energy attenuating member are substantially vertically aligned at the beginning and ending positions.

3. The vehicle seating system of claim 2, wherein the elongated metal bars of the left and right energy attenuating members are formed in a sideways letter V shape with straight sections between bends at each end and in the middle of the bars.

4. The vehicle seating system of claim 2, wherein the left and right pairs of upper and lower stationary pivots are built into a stationary bracket configured for attachment to the vehicle compartment.

5. The vehicle seating system of claim 4, wherein the left and right pairs of upper and lower seat pivots are built into left and right seat frame elements, and wherein the upper flanges of the energy attenuating members are connected to the left and right seat frame elements.

6. The vehicle seating system of claim 5, wherein the lower flanges of the energy attenuating members are connected to the stationary bracket.

7. The vehicle seating system of claim 6, wherein the stationary bracket is connected to a seat height adjustment mechanism.

8. The vehicle seating system of claim 1, wherein the pivot arms extend in a rearward direction from a back of the seat.

9. The vehicle seating system of claim 1, wherein the left and right pairs of upper and lower seat pivots are part of a seat mounting bracket configured for attachment to a vehicle seat.

10. An energy attenuating vehicle seating system configured to attenuate shock loads imparted through a vehicle compartment to a seat occupant during a high energy impact event, the seat mounting system comprising:
   a first pair of generally horizontally extending pivot arms comprising a first upper pivot arm, and a first lower pivot arm disposed below and parallel to the first upper pivot arm, the first upper and lower pivot arms each pivotally connected at one end thereof to a seat by first upper and lower seat pivots respectively, and at an opposite end thereof to first upper and lower stationary pivots respectively, wherein a spacing between the first upper and lower seat pivots and the first upper and lower stationary pivots are the same, and a pivot-to-pivot length of the first upper and first lower pivot arms are the same, the pivot arms thereby constraining the seat to translate without rotation along an arcuate path in a substantially vertical direction from a beginning position to an ending position; and
   a first energy attenuating member disposed between the seat and vehicle compartment, comprising an elongated metal bar between an upper flange and a lower flange, the upper flange rigidly connected to the seat, and the lower flange configured for rigid attachment to the vehicle compartment, wherein the first energy attenuating member is configured to remain rigid while shock loads imparted to the seat through the first energy attenuating member are less than a predetermined threshold value, and to deform in a predictable manner in response to a shock load exceeding the threshold value, allowing the pivot arms to rotate about the stationary pivots, and the seat along with the upper flange of the first energy attenuating member to translate without rotation along the arcuate path between the beginning and ending positions.

11. The energy attenuating vehicle seating system of claim 10, further comprising:
   a second, mirrored pair of pivot arms comprising a second upper and a second lower pivot arm adjacent to and spaced apart from the first pair of pivot arms, the second pair of pivot arms each connected at one end to the seat by a second pair of upper and lower seat pivots with the same orientation and spacing as the first pair of upper and lower seat pivots, and at the other end to a second pair of upper and lower stationary pivots with the same orientation and spacing as the first pair of upper and lower stationary pivots; and
   a substantially identical second energy attenuating member disposed between the seat and vehicle compartment, the second energy attenuating member adjacent to and spaced apart from the first energy attenuating member.

12. The energy attenuating vehicle seating system of claim 11, wherein the first pair of seat pivots are proximate a left side of the seat, and the second pair of seat pivots are proximate a right side of the seat.

13. The energy attenuating vehicle seating system of claim 12, wherein the first and second pairs of pivot arms extend in a rearward direction from a back of the seat.

14. The energy attenuating vehicle seating system of claim 13, wherein the first and second pairs of stationary pivots are built into a stationary bracket configured for attachment to the vehicle compartment.

15. The energy attenuating vehicle seating system of claim 10, wherein the upper and lower flanges of the energy attenuating member are substantially vertically aligned at the beginning and ending positions.

16. An energy attenuating vehicle seating system comprising:
   a seat with a pair of left upper and lower seat pivots, and a pair of right upper and lower seat pivots;
   a pair of left upper and lower stationary pivots, and a pair of right upper and lower stationary pivots;
   a pair of left and right upper pivot arms, each connected at one end to a respective upper seat pivot, and at the other end to a respective upper stationary pivot;
   a pair of left and right lower pivot arms, each connected at one end to a respective lower seat pivot, and at the other end to a respective lower stationary pivot, the pairs of pivot arms thereby constraining the seat to translate without rotation along an arcuate path in a substantially vertical direction from a beginning position to an ending position; and
   an energy attenuating member disposed between the seat and vehicle compartment, comprising an elongated metal bar between an upper flange and a lower flange, the upper flange rigidly connected to the seat, and the lower flange configured for rigid attachment to the vehicle compartment, wherein the energy attenuating member is configured to remain rigid while shock loads imparted to the seat through the energy attenuating member are less than a predetermined threshold value, and to deform in a predictable manner in response to a shock load exceeding the threshold value, allowing the pivot arms to rotate about the stationary pivots as the seat along with the upper flange of the energy attenuating member translate without rotation along the arcuate path between the beginning and ending positions.

17. The energy attenuating vehicle seating system of claim 16, wherein the upper and lower pivot arms are all the same length.

18. The energy attenuating vehicle seating system of claim 17, wherein the left seat pivots and left stationary pivots define a parallelogram, and the right seat pivots and right stationary pivots define an identical parallelogram.

19. The energy attenuating vehicle seating system of claim 18, wherein the upper and lower seat pivots all lie in a first plane, and the upper and lower stationary pivots all lie in a second plane parallel to the first plane.

20. The energy attenuating vehicle seating system of claim 16, wherein the upper and lower flanges of the energy attenuating member are substantially vertically aligned at the beginning and ending positions.

* * * * *